(12) United States Patent
Johansson

(10) Patent No.: US 6,949,275 B2
(45) Date of Patent: *Sep. 27, 2005

(54) PACKAGING LAMINATE AND CONTAINER INCLUDING IT

(75) Inventor: Hans Johansson, Lomma (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 36 days.

This patent is subject to a terminal disclaimer.

(21) Appl. No.: 10/363,671

(22) PCT Filed: Sep. 20, 2001

(86) PCT No.: PCT/SE01/02024

§ 371 (c)(1),
(2), (4) Date: Mar. 6, 2003

(87) PCT Pub. No.: WO02/24544

PCT Pub. Date: Mar. 28, 2002

(65) Prior Publication Data

US 2004/0028857 A1 Feb. 12, 2004

(30) Foreign Application Priority Data

Sep. 22, 2000 (SE) .............................................. 0003399

(51) Int. Cl.[7] .............................................. B32B 19/00
(52) U.S. Cl. ..................... 428/36.7; 428/349; 428/513; 428/516
(58) Field of Search ............................. 428/34.2, 36.7, 428/34.3, 349, 513, 516

(56) References Cited

U.S. PATENT DOCUMENTS

| | | | | |
|---|---|---|---|---|
| 4,807,745 A | * | 2/1989 | Langley et al. | 206/245 |
| 4,842,951 A | | 6/1989 | Yamada et al. | |
| 5,204,179 A | * | 4/1993 | Baker et al. | 428/336 |
| 5,522,506 A | * | 6/1996 | Roulin et al. | 206/531 |
| 6,416,620 B1 | * | 7/2002 | Narancic et al. | 162/5 |

FOREIGN PATENT DOCUMENTS

| | | |
|---|---|---|
| DE | 19703901 A1 | 8/1998 |
| EP | 0331072 A2 | 9/1989 |
| WO | WO98/45111 | 10/1998 |

* cited by examiner

*Primary Examiner*—Sandra Nolan Rayford
(74) *Attorney, Agent, or Firm*—Buchanan Ingersoll PC

(57) ABSTRACT

A packaging laminate (10) comprising a core layer (11) and a gas barrier layer (14) of moisture- and liquid-sensitive barrier polymer, e.g. a copolymer of ethylene and vinyl alcohol (EVOH). The packaging laminate (10) preferably has outer liquid-tight coatings (12 and 13) of thermoplastic in order to make for sealing of the packaging laminate by thermosealing. In order to impart increased moisture and liquid protection to the moisture- and liquid-sensitive barrier layer (14), the packaging laminate (10) has a layer (16) of mineral filled polyolefin between the barrier layer (14) and the outer, liquid-tight coating (13) on the one side of the core layer (11). A packaging container produced from the packaging laminate (10) makes for the storage of a packed liquid food, such as juice, wine, cooling oil etc., with so-called extended shelf life.

17 Claims, 1 Drawing Sheet

PACKAGING LAMINATE AND CONTAINER INCLUDING IT

FIELD OF THE INVENTION

The present invention relates to a packaging laminate comprising a core layer and a gas barrier layer of moisture-sensitive thermoplastic material, as well as a packaging container, produced from the packaging laminate, and intended for foods of extended shelf life.

BACKGROUND OF THE INVENTION

Nowadays, liquid foods are most generally packed and transported in packaging containers of single-use disposable type, and a very large group of these so-called single-use disposable packages is produced from a packaging laminate comprising a core layer of paper or paperboard and outer coatings of a thermoplastic, normally polyethylene. Well-known examples of such commercial single-use disposable packages are those sold under the registered trademarks Tetra Brik®, Tetra Rex® and Tetra Top®.

Packaging containers produced from a packaging laminate which exclusively consists of paper and/or paperboard layers and outer coatings of polyethylene are per se sufficiently mechanically strong and stable to withstand outer stresses in normal transport and handling, but almost totally lack the requisite tightness properties vis-à-vis gases for the reliable storage of oxygen gas-sensitive products such as juice and wine which very rapidly deteriorate in contact with oxygen gas. In order to impart to the packaging containers the requisite tightness properties against gases, in particular oxygen gas, the prior art packaging laminate is therefore supplemented with a so-called barrier layer between the paper or paperboard layer and the one outer coating.

Normally, use is made as barrier layer of an extremely thin aluminium foil ('Alifoil') which, in addition to its extremely good tightness properties, also enjoys the advantage that it makes for thermosealing by inductive heating of the packaging laminate when this is reformed into packaging containers. However, a problem is that an aluminium foil lacks ductility or extensibility and, as a result, shows a tendency to rupture or crack when it is subjected to extreme tensile stresses in connection with the reforming of the packaging laminate into packaging containers, whereby the desired tightness properties may readily deteriorate or be lost altogether. Moreover, an aluminium foil is extremely expensive and, as a result, contributes in unnecessarily increasing the material costs of the packaging laminate.

Another example of barrier layers in a packaging laminate of the above-described type is a layer of a so-called barrier polymer, and the most common of these barrier polymers is a copolymer of ethylene and vinyl alcohol (EVOH). An EVOH layer possesses barrier properties against gases, in particular oxygen gas, almost on a par with an aluminium foil, but in addition enjoys the major advantage that it is sufficiently ductile or extensible so as not to rupture or crack when it is subjected to extreme tensile stresses during the reforming of the packaging laminate into packaging containers. Furthermore, an EVOH layer is more economical than a comparable aluminium foil. On the other hand, an EVOH layer, like layers of other known barrier polymers such as, for example, polyvinyl alcohol and certain polyamides, is extremely moisture-sensitive and, as a result, rapidly loses its gas tightness properties when coming into contact with moisture or liquid. A certain protection against the action of moisture and liquid is imparted to the EVOH layer by both of the outer coatings of thermoplastic of the packaging laminate, but this protection is relatively short-lived and sufficient only during a limited, first period of time of the normal service life of a packaging container.

In an earlier attempt to solve the above-described problem with insufficient moisture and liquid protection, the prior art packaging laminate has been provided with thicker outer coatings of thermoplastic, preferably polyethylene. Granted, this solution imparts to the moisture-sensitive barrier layer an extended moisture and liquid protection, but a thicker outer coating of thermoplastic in direct contact with certain types of foods such as fruit juices gives the packed food poorer product protection because of an increased absorption of essential oils and aromatic substances (so-called scalping).

Another earlier attempt to impart to the prior art packaging laminate increased moisture and liquid protection has taken as its point of departure making the moisture- and liquid-sensitive barrier layer thicker, but this proposed solution entails increased material consumption and consequentially increased material costs for the packaging laminate.

SUMMARY OF THE INVENTION

Hence, there is still a need for an improved packaging laminate of the type described by way of introduction, and one object of the present invention is therefore to disclose how the described problem with insufficient moisture and liquid protection in such a packaging laminate may efficiently and readily be solved without accompanying problems and drawbacks which are inherent in the previously proposed solutions.

A further object of the present invention is to realise a packaging laminate comprising a core layer and a gas barrier layer of moisture-sensitive thermoplastic material for a packaging container possessing excellent tightness properties against gases, in particular oxygen gas, throughout the entire service life of the packaging container.

Still a further object of the present invention is to realise a packaging container produced from the packaging laminate and intended for liquid foods of extended shelf life.

These and other objects and advantages will be attained according to the present invention by means of a packaging laminate and by means of a packaging container, produced from the packaging laminate according to the present invention. Expedient and practical embodiments of the packaging laminate according to the present invention have further been given the characterising features described herein.

Thus, according to the present invention there will be realised a packaging laminate comprising a core layer and a gas barrier layer of a moisture-sensitive thermoplastic material in which the moisture-sensitive gas barrier layer is protected against the action of moisture and liquid by means of a layer of mineral filled or extended polyolefin.

A suitable mineral filled polyolefin layer for employment as moisture protection for the moisture-sensitive gas barrier layer in the packaging laminate according to the present invention is easy to produce using extant equipment in the art, and has, in comparison with corresponding layers of pure or unfilled polyolefin, e.g. the previously proposed thicker outer thermoplastic coating, advantageously lower permeation rates for moisture. A mineral filled polyolefin layer also displays lower material cost per kilogram than a corresponding layer of pure or unfilled polyolefin and may, thus, without increased relative material cost, be made thicker than the compared, pure polyolefin layer. Moreover, a mineral filled polyolefin layer per se displays a certain material rigidity which advantageously contributes in imparting increased rigidity to the packaging laminate.

A suitable mineral filled polyolefin layer for use in the packaging laminate according to the present invention comprises a basic matrix of polyolefin with admixed inorganic mineral particles in quantities which generally lie within the range of from 5 to 85% of the total weight of the mineral filled polyolefin layer. Since increased quantities of admixed inorganic mineral particles impart to the mineral filled polyolefin layer increased resistance to moisture, i.e. reduced permeability to moisture, the quantity of inorganic material particles in each individual case may be adapted to the final field of application of the relevant packaging laminate. If the packaging laminate is intended for packing, for example, particularly oxygen gas-sensitive liquid foods such as juice and wine, or if the packaging laminate is to be employed for packing liquid foods with so-called extended shelf life, greater quantities of the inorganic particles are suitably selected within the above-mentioned range in order thereby to impart to the moisture-sensitive gas barrier layer increased protection against the action of moisture. For such fields of application of the packaging laminate, the mineral filled polyolefin layer includes inorganic mineral particles in quantities which preferably exceed approx. 50% of the total weight of the mineral filled polyolefin layer.

Examples of applicable inorganic material particles for use in the present invention are particles selected from the group essentially consisting of dolomite, talcum, chalk, mica, limestone, marble, kaolin and wollastonite (tabular spar).

Preferably, the inorganic material particles are a mixture of dolomite and talcum particles in which the quantity of dolomite particles is between 70 and 90% and the quantity of talcum particles is between 10 and 30%, calculated on the total weight of the mixture.

Preferably, the basic matrix of the mineral filled polyolefin layer consists of a propylene based polyolefin, such as, for example, a propylene homopolymer or a copolymer of propylene and ethylene and/or another alkene. Preferably, the propylene based polyolefin is a propylene homopolymer with an ASTM melt index of less than 10 (2.16 kg; 230° C.) or a copolymer of propylene and/or other alkene with an ASTM melt index of 0.5–5 (2.16 kg; 230° C.).

The moisture-sensitive gas barrier layer in the packaging laminate according to the present invention may consist of any suitable gas barrier polymer whatever, such as, for example, a polyvinyl alcohol (PVOH) or a copolymer of ethylene and vinyl alcohol (EVOH), but is preferably a copolymer of ethylene and vinyl alcohol (EVOH).

Further, the core layer in the packaging laminate according to the present invention may either be a layer of paper or paperboard or a layer of plastic. In that case when the core layer is a paper or paperboard layer, the packaging laminate preferably has outer liquid-tight coatings of thermoplastic, which imparts to the moisture- and liquid-sensitive core layer the requisite protection against moisture and liquid, at the same time as they contribute in increased moisture and liquid protection for the moisture-sensitive gas barrier layer of the packaging laminate. Outer layers of thermoplastic on both sides of the core layer moreover render the packaging laminate sealable by so-called thermosealing, which is a simple, but efficient sealing method for realising mechanically strong and liquid-tight sealing joints or seams when the packaging laminate is reformed into packaging containers. Preferably, the outer liquid-tight coatings consist of polyethylene, such as, for example, high density polyethylene (HDPE), medium density polyethylene (MDPE), low density polyethylene (LDPE), linear low density polyethylene (LLDPE), polyethylene of very low density (VLDPE) and polyethylene with ultralow density (ULDPE).

BRIEF DESCRIPTION OF THE DRAWING

The present invention will now be described and explained in greater detail hereinbelow, with the aid of non-restrictive embodiments and with particular reference to the accompanying Drawing, in which.

DETAILED DESCRIPTION OF THE INVENTION

Figure 1:
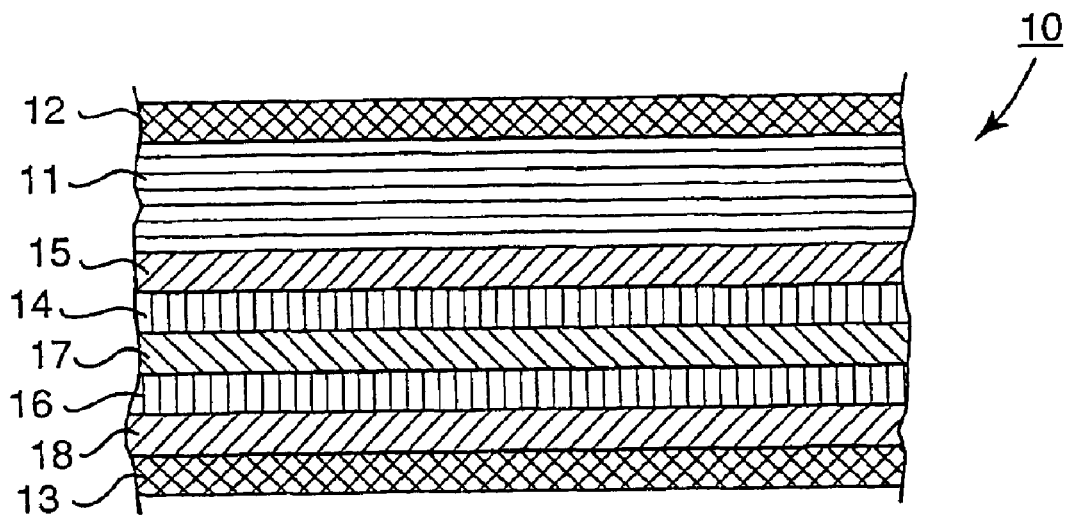
FIG. 1 schematically illustrates a cross section of a first packaging laminate according to the present invention.

FIG. 1 schematically illustrates a cross section of a first packaging laminate according to the present invention. The packaging laminate carrying generic reference numeral 10 includes a core layer 11 of rigid, but foldable material, and outer, liquid-tight coatings 12 and 13 of thermoplastic.

Between the core layer 11 and the one 13 of the two outer, liquid-tight coatings, the packaging laminate 10 has a gas barrier layer 14 of a moisture- and liquid-sensitive material which is bonded to the core layer 11 by the intermediary of an interjacent layer 15 of suitable adhesive.

In order to protect the moisture- and liquid-sensitive gas barrier layer 14 from the action of moisture and liquid, the packaging laminate 10 moreover has a layer 16 of mineral filled polyolefin between the gas barrier layer 14 and the one 13 of the two outer, liquid-tight coatings. In the illustrated example, the mineral filled polyolefin layer 16 is bonded to the moisture- and liquid-sensitive gas barrier layer 14 and the outer, liquid-tight coating 13 via respective layers 17 and 18 of suitable adhesive.

The mineral filled polyolefin layer 16 consists, for example, of a basic matrix of a propylene based polymer with admixed inorganic mineral particles in a quantity of between 5 and 85%, e.g., 50–85%, calculated on the total weight of the mineral filled polyolefin layer 16. Preferably, the mineral filled polyolefin layer 16 consists of a basic matrix of a propylene homopolymer with an ASTM melt index of less than 10 (2.16 kq: 230° C.) or a copolymer of propylene and ethylene and/or other alkene with an ASTM melt index of 0.5–5 (2.16 kq: 230° C.), in which event the inorganic mineral particles may be mineral particles selected from the group essentially consisting of dolomite, talcum, chalk, mica, limestone, marble, kaolin and wollastonite (tabular spar). Preferably, the inorganic mineral particles are a mixture of dolomite and talcum particles in which the quantity of dolomite particles is between 70 and 90% and the quantity of talcum particles is between 10 and 30%, calculated on the total weight of the mixture.

The moisture- and liquid-sensitive gas barrier layer 14 may, for example, consist of a moisture- and liquid-sensitive barrier polymer, e.g. a copolymer of ethylene and vinyl alcohol (EVOH).

The core layer 11 may be a plastic layer, but is preferably a layer of paper or paperboard of suitable packaging quality.

The two outer, liquid-tight thermoplastic coatings 12 and 13 of the packaging laminate 10 may consist of the same or different thermoplastics, but preferably consist of the same thermoplastic. A suitable thermoplastic for the two outer coatings 12 and 13 is polyethylene which has been selected from the group essentially consisting of HDPE, MDPE, LDPE, LLDPE, VLDPE and ULDPE.

The packaging laminate 10 may be produced in a simple manner, in that a web of paper or paperboard is coated on its one side with a film of thermoplastic (the outer coating 12 of the packaging laminate 10), and on its other side is coated with a multilayer film including a film of moisture- and liquid-sensitive barrier polymer (the gas barrier layer 14 of the packaging laminate 10), a film of mineral filled polyolefin (the moisture- and liquid-protective layer 16 of the packaging laminate), and a film of thermoplastic (the outer coating 13 of the packaging laminate 10), the films being extruded simultaneously on the web by a co-extrusion process. In order reliably to bond the co-extruded individual films to one another and to the paper or paperboard web, and thereby ensure a good and durable integrity in the produced packaging laminate 10, films of suitable adhesive are extruded simultaneously between each respective individual film and between the films and the paper or paperboard web. Suitable adhesives are well-known to a person skilled in the art, and suitable combinations of such adhesives may readily be selected by a person skilled in the art in order to achieve the optimum bonding strength between each respective material layer of the packaging laminate 10.

Figure 2:
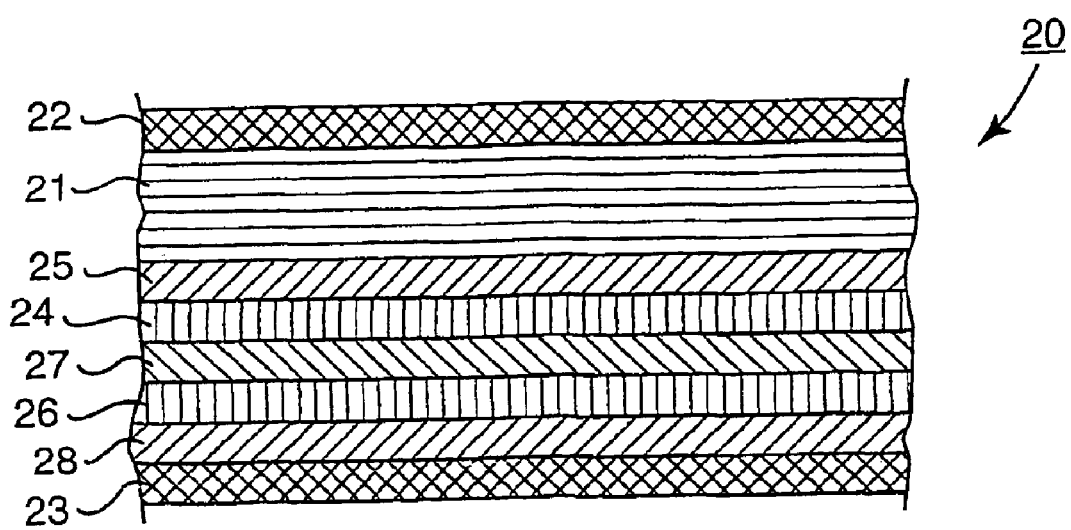
FIG. 2 schematically illustrates a cross section of a second packaging laminate according to the present invention.

FIG. 2 schematically illustrates a cross section of a second packaging laminate according to the present invention. The packaging laminate carrying generic reference numeral 20 includes a core layer 21 of rigid, but foldable material, and outer, liquid-tight coatings 22 and 23 of thermoplastic.

Between the core layer 21 and the one 23 of the two outer, liquid-tight coatings, the packaging laminate 20 has a gas barrier layer 24 of a moisture- and liquid-sensitive material which is bonded to the core layer 21 by the intermediary of an interjacent layer 25 of suitable adhesive.

In order to protect the moisture- and liquid-sensitive gas barrier layer 24 from the action of moisture and liquid, the packaging laminate 20 moreover has a layer 26 of mineral filled polyolefin between the gas barrier layer 24 and the outer, liquid-tight coating 23. In this example, the mineral filled polyolefin layer 26 is bonded to the moisture- and liquid-sensitive gas barrier layer 24 and the outer, liquid-tight coating 23 via respective intermediate layers 27 and 28 of suitable adhesive.

The mineral filled polyolefin layer 26 consists, for example, of a basic matrix of a propylene based polymer with admixed inorganic mineral particles in a quantity of between 5 and 85%, e.g. 50–85%, calculated on the total weight of the mineral filled polyolefin layer 26. Preferably, the mineral filled polyolefin layer 26 consists of a basic matrix of a propylene homopolymer with an ASTM melt index of less than 10 (2.16 kq: 230° C.) or a copolymer of propylene and ethylene with an ASTM melt index of (2.16 kq; 230° C.), in which event the inorganic mineral particles may be mineral particles selected from the group essentially consisting of dolomite, talcum, chalk, mica, limestone, marble, kaolin and wollastonite (tabular spar). Preferably, the inorganic mineral particles are a mixture of dolomite and talcum particles in which the quantity of dolomite particles is between 70 and 90 the quantity of talcum particles is between 10 and 30%, calculated on the total weight of the mixture.

The moisture- and liquid-sensitive gas barrier layer 24 may, for example, consist of a moisture- and liquid-sensitive barrier polymer, e.g. a copolymer of ethylene and vinyl alcohol (EVOH).

The core layer 21 may be a plastic layer, but is preferably a layer of paper or paperboard of suitable packaging quality.

The two outer, liquid-tight thermoplastic coatings 22 and 23 of the packaging laminate 20 may consist of the same or different thermoplastics, but preferably consist of the same thermoplastic. A suitable thermoplastic for the two outer coatings 22 and 23 is polyethylene which has been selected from the group essentially consisting of HDPE, MDPE, LDPE, LLDPE, VLDPE and ULDPE.

Thus, the packaging laminate 20 has, in all essentials, the same composition as the illustrated packaging laminate 10 in FIG. 1, but differs principally from the latter in the method in which it is produced. While the packaging laminate 10 is produced by a co-extrusion process where all layers on the one side of the core layer 11 are coextruded direct on a web of paper or paperboard, the packaging laminate 20 is produced by a lamination process in which a prefabricated, co-extruded multi-layer film including a film of moisture- and liquid-sensitive barrier polymer (the gas barrier layer 24 of the packaging laminate 20), a film of mineral filled polyolefin (the liquid-protective layer 26 of the packaging laminate 20) and a film of thermoplastic (the outer coating 23 of the packaging laminate 20) are laminated and permanently united with one side of a paper or paperboard web which, on its other side, is covered or coated with a film of thermoplastic (the outer coating 22 of the packaging laminate 20). Good and permanent bonding strength between the pre-fabricated, co-extruded multi-layer film and the paper or paperboard web is ensured by a film of suitable adhesive (the adhesive layer 25 of the packaging laminate 20) which is simultaneously extruded between the paper or paperboard web and the prefabricated, co-extruded multi-layer film.

From the packaging laminate according to the present invention, dimensionally stable packaging containers are produced in a per se known manner with the aid of modern packing and filling machines of the type which, from a web or from prefabricated sheets of the packaging laminate, both form, fill and seal finished packages in accordance with a so-called form/fill/seal technology.

From, for example a web, packaging containers are produced in that the web is first reformed into a tube by both of the longitudinal edges of the web being united to one another in a liquid-tight overlap joint or seam with the packaging laminate placed on that side of the core layer which is turned to face inwards in the tube. The tube is filled with the relevant contents, e.g. juice, and is divided by repeated transverse seals into individual cushion-shaped packaging units which are separated from one another by incisions in the transverse sealing zones. By a subsequent forming and sealing operation, the cushion-shaped packaging units are thereafter given their final geometric, normally parallelepipedic, configuration.

A packaging container produced from a packaging laminate according to the present invention possesses sufficiently good tightness properties against both liquids and gases so as to make possible a lengthy and reliable storage of even particularly storage sensitive and perishable foods of the type such as juice, wine and cooking oil.

It will thus have been apparent from the foregoing description that the present invention, in a simple manner and by simple means, attains the objects set out above. Even though the detailed description of the present invention with reference to the appended Drawing relates to specific embodiments, the present invention is naturally not restricted exclusively to them. It will be obvious to the skilled reader of this specification that many alterations and modifications are conceivable without departing from the inventive concept as this is defined in the appended claims.

What is claimed is:

1. A packaging laminate, comprising:
   a core layer of paper or paperboard;
   first and second outer thermosealable layers of plastic located on opposite sides of the core layer;
   a gas barrier layer of moisture-sensitive thermoplastic located between the core layer and the first outer thermosealable layer; and
   a layer of mineral filled polyolefin located on only one side of the gas barrier layer between the gas barrier layer and the first outer thermosealable layer, the mineral filled polyolefin layer protects the moisture-sensitive gas barrier layer against moisture and liquid.

2. The packaging laminate as claimed in claim 1, wherein the mineral filled polyolefin layer includes mineral particles in a quantity of from 5 to 85% of the total weight of the mineral filled polyolefin layer.

3. The packaging laminate as claimed in claim 1, wherein the mineral filled polyolefin layer includes inorganic mineral particles in a quantity of from 50 to 85% of the total weight of the mineral filled polyolefin layer.

4. The packaging laminate as claimed in claim 1, wherein the inorganic mineral particles are selected from the group essentially consisting of dolomite, talcum, chalk, mica, limestone, marble, kaolin, wallanstonite and mixtures thereof.

5. The packaging laminate as claimed in claim 4, wherein the inorganic mineral particles comprise a mixture of dolomite and talcum particles.

6. The packaging laminate as claimed in claim 5, wherein the total quantity of dolomite particles is between 70 and 90 weight % and the total quantity of talcum particles is between 10 and 30 weight %.

7. The packaging laminate as claimed in claim 1, wherein the mineral filled polyolefin layer includes a polyolefin which is selected from the group consisting of polypropylene based polyolefins.

8. The packaging laminate as claimed in claim 7, wherein the polypropylene based polyolefin is a copolymer of propylene and/or other alkene.

9. The packaging laminate as claimed in claim 1, wherein the moisture-sensitive gas barrier layer consists of a copolymer of ethylene and vinyl alcohol.

10. The packaging laminate as claimed in claim 1, wherein the thermosealable plastic includes polyethylene.

11. The packaging laminate as claimed in claim 10, wherein the polyethylene is selected from the group consisting of high density polyethylene, medium density polyethylene, low density polyethylene, linear low density polyethylene, polyethylene of very low density and polyethylene with ultralow density.

12. A packaging container which provides extended shelf life for liquid foods, wherein the packaging container is produced by fold forming and sealing a sheet- or web-shaped packaging laminate as claimed in claim 1.

13. A packaging container comprising the packaging laminate as claimed in claim 1.

14. A packaging laminate, comprising:
   a core layer of paper or paperboard;
   a first outer thermosealable layer of plastic directly on a first side of the core layer;
   a second outer thermosealable layer of plastic located on a second side of the core layer;
   a gas barrier layer of moisture-sensitive the thermoplastic located between the core layer and the second outer thermosealable layer; and
   a layer of mineral filled polyolefin located between the gas barrier layer and the second outer thermosealable layer.

15. The packaging laminate as claimed in claim 14, wherein the mineral filled polyolefin layer includes inorganic mineral particles in a quantity of from 50 to 85% of the total weight of the mineral filled polyolefin layer.

16. A packaging container produced by fold forming and sealing a sheet- or web-shaped packaging laminate as claimed in claim 14.

17. A packaging container comprising the packaging laminate as claimed in claim 14.

* * * * *